United States Patent [19]
Wechsler

[11] 3,800,307
[45] Mar. 26, 1974

[54] THREE DIMENSIONAL AUTOSTEREOSCOPIC PRODUCTION OF SELECTOR SCREEN IMAGES FORMED OF PERSPECTIVES TAKEN FROM DISCRETE POINTS OF VIEW

[76] Inventor: Robert M. Wechsler, 475 F.D.R. Drive, New York, N.Y. 10022

[22] Filed: Apr. 6, 1972

[21] Appl. No.: 241,692

[52] U.S. Cl. ............................................... 95/18 R
[51] Int. Cl. ............................................. G03b 35/08
[58] Field of Search ........................................ 95/18

[56] References Cited
UNITED STATES PATENTS

| | | | |
|---|---|---|---|
| 2,644,382 | 7/1953 | Ayres | 95/18 P |
| 2,045,093 | 6/1936 | Newcomer | 95/18 P |
| 2,045,119 | 6/1936 | Carpenter | 95/18 P |
| 2,185,221 | 1/1940 | Nakken | 95/18 P |
| 2,150,932 | 3/1939 | McDonnell | 95/18 P |
| 1,882,424 | 10/1932 | Ives | 95/18 P |
| 2,336,331 | 12/1943 | Wittel | 95/18 P |

*Primary Examiner*—John M. Horan
*Attorney, Agent, or Firm*—Laurence R. Hefter

[57] ABSTRACT

A method of producing a three-dimensional autostereoscopic image of a scene is disclosed in which a static camera or a camera employing a discontinuous scan is used to obtain a plurality of perspectives of the scene taken from different points of view, such discrete points of view being separated in accordance with the teachings of the invention by at least a predetermined amount. A discontinuous scan camera is disclosed in which a single optical system is used to obtain the several perspectives from the different points of view.

14 Claims, 4 Drawing Figures

THREE DIMENSIONAL AUTOSTEREOSCOPIC PRODUCTION OF SELECTOR SCREEN IMAGES FORMED OF PERSPECTIVES TAKEN FROM DISCRETE POINTS OF VIEW

BACKGROUND OF THE INVENTION

For the purposes of this disclosure, "object space" means the space containing the objects viewed by a camera, and "image space" means that space occupied by the three-dimensional relief image of object space. An "image" is a visual reproduction in relief of object space, partially defined with respect to its depth axis, or Z-axis, which is the normal to the image plane, that is, the plane immediately behind and parallel to the selector screen provided for taking and viewing pictures in accordance with the invention. The image plane is usually occupied by a sheet of film. A "perspective", as distinguished from an image, is a two-dimensional visual reproduction of object space taken from a single point of view; a plurality of perspectives from different points of view may be stored and viewed in a particular manner to form an image.

There is a small array of methods generally employed in forming three-dimensional images without the use of coherent light, in which perspectives taken from different points of view are stored on a photographic emulsion or other photosensitive layer, which may then be viewed to obtain a three-dimensional image. Several of these methods involve the use of one or more lenses forming perspectives upon a photosensitive layer through a line screen, lenticular screen, fly's eye lens (lenslet) array or other selector screen for forming the perspectives into numerous discrete fields. Such selector screens are well known in the art and need not be described further here.

One of these methods employs relative movement between one or more of the following: the objects being photographed, the lens or lenses, the selector screen and the film. This relative movement, aside from obtaining perspectives of the scene from different points of view, is designed to render an orthoscopic rather than a pseudoscopic view, the latter being a reproduction of the scene in image space with the depth, or Z-axis, inverted so that objects in the foreground in object space appear in the background in image space, and vice versa. In some cameras in which a moving or scanning lens is employed to obtain perspectives from different points of view, a pseudoscopic image is obtained which must be corrected by other techniques.

A second of these methods of reproducing three-dimensional scenes involves the use of a static camera with a plurality of lenses or a single large lens, in either case the span of the camera's view usually being wider than an interocular distance, i.e. the distance between the human eyes. Perspectives formed on the film plane from these separated points of view are recorded simultaneously rather than sequentially. An orthoscopic image may be obtained by employing prisms, mirrors or other inverters or by rephotographing the original pseudoscopic image, or by the use of retroreflector screens.

Generally, in either the static or dynamic type of camera, the greater the number of points of view within a given span of view from which perspectives are recorded, the better is the continuity of transition of perspectives when the eye is moved horizontally with respect to the finished picture. If the number of perspectives from different points of view is too small, a flipping effect is noted as the eye sees one perspective and then the next. This discontinuity or flipping effect is to be distinguished from a different so-called "flipping" effect which arises from the finite acceptance angle of the selector screen (e.g. in a lenticular screen, the field of view of a single lenticule). This acceptance angle, within which all of the lenses must lie if a viewable image is to be obtained, generally determines the maximum angle through which a single image may be viewed; if the eye is moved further than this angle in viewing the resultant photograph, the image or sequence of perspectives flips and repeats itself.

With dynamic cameras, there is a tendency of the image to be blurred and unnatural due to several complex optical effects which will be described below. It has been found that blurring or ghost perspectives may also occur with static cameras if certain criteria are not observed with respect to the size of the lens apertures and the spacing between aperture centers. On the other hand, static cameras employing too few discrete lenses produce scenes with noticeably discontinuous transitions between perspectives. The cameras described in accordance with the present invention are optimally free of discontinuities between perspectives and are optimally free of blurring, ghost perspectives and other unnatural effects resulting from placing the apertures or otherwise obtaining perspectives from points of view too close to one another, from failing to properly aperture the lenses or imaging elements, and from other optical effects. The system described in accordance with the present invention permits the production of autostereoscopic parallax photographs with extremely compact cameras, yet permits the reproduction of the greatest possible depth, viewable without eyestrain and without the presence of ghost perspectives.

Further, dynamic or scanning cameras are generally designed so that the lens continuously scans across the film or image plane, which continuous scan gives rise to certain of the unnatural effects enumerated herein which detract from the clarity and depth illusion of the resultant image. In certain prior cameras, the camera body itself must be moved during an exposure, an unwieldly procedure highly unsuitable for most conventional photography and virtually useless for snapshots, especially of moving subjects, since the entire camera must be mounted on a platform permitting relative movement between camera and platform during the exposure or sequence of exposures. Other cameras contain a multiplicity of moving elements requiring complex drive mechanisms and significant power sources, making them unwieldly to use and expensive to manufacture. As a result, the field of autostereoscopic parallax photography has remained largely a curiosity, unavailable to the amateur photographer and only available to the professional with serious limitations and at great expense.

SUMMARY OF THE INVENTION

In accordance with the invention, autostereoscopic selector screen-type cameras are disclosed in which the points of view from which individual perspectives making up an image are taken are separated in accordance with certain criteria such that the resultant image is optimally free of blurring, ghost perspectives, perspective transition discontinuities and other undesirable optical effects. In accordance with the invention, these cameras may be of extremely compact design. The choice of viewing selector and taking selector screen in accordance with certain criteria permits images optimally free of jumbled or ghost perspectives even for these compact cameras.

Also in accordance with the present invention, the tendency towards ghost perspectives and blurred views of a given depth plane in object space may be minimized by focusing the camera on that plane in object space of greatest interest in order to minimize perspective overlap due to out-of-focus type blurring at that distance.

In accordance with a particularly preferred embodiment of the invention, a discontinuous scan camera is disclosed which produces photographs optimally free of undesirable optical effects and which is relatively simple and inexpensive to make and use. In certain embodiments of the invention, the lens is caused to scan in a continuous motion across the selector screen, discrete perspectives being taken during such scan by illuminating the subject being photographed or otherwise exposing the film only for discrete time periods corresponding to the respective points of view. The time periods in the preferred embodiment are preferably sufficiently short compared to the scan speed that the taking lens is effectively static relative to the camera during each perspective exposure. The term "effectively static" or equivalent terminology used herein means that the exposure for each perspective is short enough that no significant lens motion or double exposure type blur (explained below under the 2nd and 5th listed sources of error) results from the relative motion between the taking lens and the camera. In accordance with the invention, discrete perspective cameras are disclosed wherein the points of view from which perspectives are formed are separated by a distance at least equal to and preferably greater than the lens aperture width.

These undesirable optical effects referred to above may be separately considered as follows, wherein the effects are initially considered in relation to a dynamic, or scanning camera.

Firstly, in any realizable lens, the lens aperture has a finite width, so that it subtends a finite angle with respect to an object it views, and hence views that object from more than one point of view. For present purposes, define the lens aperture width, or effective lens aperture width in some cases (to be defined herein) as $w$. This effect is used to advantage in large lens selector screen cameras to produce pseudoscopic three-dimensional pictures which exhibit parallax change. However, in those autostereoscopic cameras where is it desired that a given lens aperture view a scene from only one point of view at a time, this "large lens" effect is undesirable, and is preferably minimized by making the aperture as small as possible. Small apertures, however, give rise to undesirable diffraction effects with attendant loss of image resolution. Thus a compromise must be made in aperture size to minimize optimally pseudoscopic parallax effects and on the other hand to keep down resolution loss due to diffraction. There are other primary effects of decreasing lens aperture. In addition to cutting down the "large-lens parallax" effect, the depth of field in an individual perspective, as in conventional photography, is increased. The exposure time required is also increased to some extent for non-ideal selector-screens. It is possible in accordance with this invention to control the depth-of-field and exposure time requirement aperture function independently of the control of the "large lens" effect.

Secondly, in a continuous scan camera, with relative movement between selector screen and lens, perspectives formed at two points of view during the scan separated by a distance, relative to the selector screen, less than the aperture width of the lens causes blurring analogous to that exhibited by two overlapping pictures forming a double exposure. Stated another way, it is desirable for each eye to see only one perspective at a time as it scans across a parallax photograph; as it leaves each perspective and passes on to the next, there should be no overlap. (The phenomenon in which an eye at a single point of view sees a superposition of more than one perspective is termed herein "perspective overlap" or "ghosting of perspectives"). Unless the distance relative to the selector screen between the points of view from which perspectives are formed is equal to or greater than the width of the lens aperture, this condition cannot be met and hence double exposure type blur or degradation results.

Thirdly, any selector screen process for storing multiple perspectives gives rise to an error which will be termed herein as the "collective retroreflector spreading aberration" or "C.R.S. aberration". The camera selector screen, film, and viewing selector screen act collectively as a retro-reflector of light. Three main sources combine to cause the C.R.S. aberration, with the result that a cone of light converging on this collective retro-reflector is imperfectly retro-reflected. The returning cone of light will be broader. In autostereoscopic selector screen pictures, the C.R.S. aberration increases the angle relative to the viewing selector screen over which any given perspective is viewable. Thus, if in a continuous scan camera a shutter were employed to take successive perspectives from points of view separated by a distance (measured relative to the selector screen) equal to the lens aperture (thus correcting the second type of error), certain perspective overlap would still occur. One source of the C.R.S. aberration is diffraction occurring in both the camera selector screen and viewing selector screen. Most of the perspective overlap resulting from diffraction may be avoided by spacing the points of view (relative to the selector screen) from which perspectives are recorded by a length which subtends (for the given lens to selector screen distance) an angle $\theta + x_{d.1.} + Y_{d.1.}$, where $\theta$ is the angle subtended at the camera selector screen by the aperture width $w$ used to record a single perspective, $x_{d.1.}$ is the minimum resolution angle of the camera selector screen treated as diffraction limited, and $Y_{d.1.}$ is the analagous quantity for the viewing selector screen. $X_{d.1.}$ and $Y_{d.1.}$ are between $\lambda/A$ and $1.22 \lambda/A$ for most selector screen configurations, where $\lambda$ is the wavelength of the incident light and $A$ is the width of a selector screen imaging element. In most cases, $X_{d.1.}$ approximately equals $Y_{d.1.}$. Thus $\theta + X_{d.1.} + Y_{d.1.}$ approximately equals $\theta + 2X_{d.1.}$. A second source of C.R.S. aberration is the various optical aberrations present in the imaging elements of most selector screens, such as spherical or chromatic aberrations. Perspective overlap from diffraction and the various optical aberrations in combination, decreases with increased spacing of the perspective points of view past $w$. This improvement continues with increased spacing, practically speaking, until the spacing between perspective points of view subtends an angle approximately equal to $\theta + 2X + 2Y$, where $x$ is the actual minimum angle of resolution (i.e. the limit of resolution or resolving power) for an imaging element of the camera selector screen and Y is the analogous quantity for the viewing selector screen. X and Y may be considered as being approximately equal, for most practical camera embodiments, i.e. $\theta + 2X + 2Y \approx \theta + 4X$. The third source of C.R.S. aberration is the optical deterioration introduced by granularity and other properties of film related optical systems. Perspective overlap from the overall C.R.S. aberration decreases with increased spacing of the perspective points of view until, practically speaking, the spacing approximately equals $\theta + 2X_f + 2Y_f$. $X_f$ is the minimum resolution angle of the system comprised by an imaging element of the camera selector screen and the particular light sensitive medium disposed in its image plane. $Y_f$ is an analogously defined quantity for the viewing selector screen. In most practical embodiments, $X_f$ approximately equals $Y_f$, i.e. $\theta + 2X_f + 2Y_f \theta + 4X_f$. Define $\phi$ as the extra angle over which a single perspective in a selector screen photograph is significantly visible due to the C.R.S. aberration. Define $\rho$, the C.R.S. error, as the length subtending $\phi$ at the lens-to-selector screen distance employed in the camera which produced the photograph.

Fourthly, a pupillary error is inherent in selector screen photographs by virtue of the fact that the pupil of the eye has a finite width and thus subtends a finite arc relative to the viewing selector screen. Hence, even if two successive perspectives were formed by lenses with narrow enough apertures and, relative to the selector screen, separated far enough apart to avoid any error from the second and third error sources considered above, from certain points of view, particularly when the pupil-to-viewing screen distance is small, each pupil could see more than one perspective. In accordance with the present invention, to avoid pupillary error, space the perspective points of view by $w + \rho + p$, where $p$ is the pupil diameter.

Fifthly, the scan of the lens scross the film during the recording of any given single perspective is analogous to the effect of a poorly mounted lens on a conventional camera jiggling during an exposure. This type of error can be avoided by making the shutter speed for each perspective's exposure fast in relation to the movement of the lens.

Sixthly, in a selector screen camera where perspectives are recorded from discrete points of view, the optimum viewing distance of the photograph, especially where a low number of perspectives are recorded, tends to be approximately equal to the lens-to-selector screen distance in the camera. For cameras where the lens-to-selector screen distance is extremely small (and especially where it is less than the minimum focusing distance of the eye), those viewing distances which would be distant enough from the photograph to allow proper focus of the eye and avoid eye-strain result in each eye viewing a mixture of more than one perspective, resulting in image degradation. There is a particular hazard of eye-strain for short viewing distances with multiple perspective photographs made by the methods disclosed herein, because of their tremendous possible depth range. The problem of the physiological conflict of eye focus on the image-plane and eye convergence off the image plane becomes important.

In accordance with this invention, these problems may be alleviated by utilizing a viewing selector screen with elements of the same width as in the camera selector screen but of longer focal length (or greater thickness between the front of the screen and the film in the case of line screens).

Seventhly, views in the several perspectives of depth planes in object space not well focused in these perspectives, tend to be seen as overlapping from single points of view — that is, there is a greater tendency to perspective overlap for poorly focused depth planes. In accordance with the invention, this tendency toward perspective overlap for given depth planes may be reduced by focusing the camera on the plane of greatest interest in object space in order to minimize perspective overlap due to out-of-focus type blurring at that distance.

Eighthly, most selector screen cameras place the film in the focal plane of the selector screen elements. The selector screen elements are thus not sharply focusing the aperture(s) of the auxiliary lenses(es) (unless lens-to-selector screen distance is infinite) on the film, resulting in a greater tendency towards perspective overlap. In accordance with this invention, this cause of perspective overlap may be removed by locating the film at that distance $D_i$ behind the selector screen such that the selector screen elements sharply focus the lens aperture(s) (at a distance $D_o$ from the screen) on the film. $D_i$, for a selector screen with imaging elements treatable as "thin" lenses, is given by the formula $1/D_i + 1/D_o = 1/f$ where $f$ is the focal length of the selector screen elements. Preferably, however, the selector screen is made of "thick" lenses of such a thickness that $D_i$ falls on the rear surface of the screen.

Note that the second and fifth sources of error enumerated above are inherent only in scanning cameras, whereas the remaining sources of error exist in both static and scanning cameras.

In accordance with the present invention, a method of autostereoscopic image reproduction is disclosed employing a selector screen wherein the points of view from which perspectives are formed are separated relative to the selector screen by a minimum distance $d$ equal to the width of the lens aperture, and preferably by a minimum distance $d = w + \rho$ where $\rho$ is the collective retro-reflector spreading aberration at the particular lens-to-film plane distance employed. The film plane is that plane immediately behind the selector screen. In addition, the minimum distance $d$ may take into account the width of the human pupil, which thereby avoids the pupillary error. In dynamic cameras constructed to operate in accordance with the invention, the lens is caused to move or scan across the film plane and is controlled in such a manner as to form perspectives from discrete points of view rather than continuously forming perspectives from all points of view. These perspectives are, in accordance with the invention, formed at points of view separated by a distance $d$, defined above. For the purpose of controlling the above-enumerated parameters that depend on lens aperture, a variable aperture mask, preferably rectilinear, may be used in accordance with the invention wherein the height and width of the lens aperture may be separately and independently controlled. Adjustment of aperture orthogonal to the direction of scan permits control of the exposure and depth-of-field of the individual perspectives independently of the other lens aperture dependent criteria enumerated above. The aperture width control, on the other hand, permits optimization of the aperture and aperture spacing with respect to minimizing pseudoscopic parallax effects, perspective overlap, pupillary error and lens motion blur.

Due to the non-ideal nature of realizeable selector screens, there may also be a limited control exercised by the aperture width on perspective depth-of-field and perspective exposure. As will be explained, a discontinuous scan dynamic camera in accordance with the present invention may include a camera in which the actual motion of the lens scanning across the selector screen is either a continuous smooth motion or discontinuous with the lens stopping at each point of view from which a perspective is to be taken. In the case of a smooth scan, the exposure for each perspective corresponding to each point of view is preferably made short enough relative to the scan speed to effectively stop the motion of the lens relative to the camera, i.e. to avoid lens motion blur analagous to conventional-camera lens jiggle and to avoid double exposure type blur. In the case of a camera where the actual motion of the lens is discontinuous, the lens may be stopped electrically or mechanically along the scan path from one point of view to the next, and the film exposed at each point of view to obtain the desired perspective.

In a particularly preferred embodiment of the invention, a strobe light is used in conjunction with a continuous scan single lens camera for forming perspectives from discrete points of view defined by the timing of the strobe light.

BRIEF DESCRIPTION OF THE DRAWINGS

The invention will be more fully described in connection with the accompanying drawings, in which.

DESCRIPTION OF PREFERRED EMBODIMENT OF THE INVENTION

Figure 1:
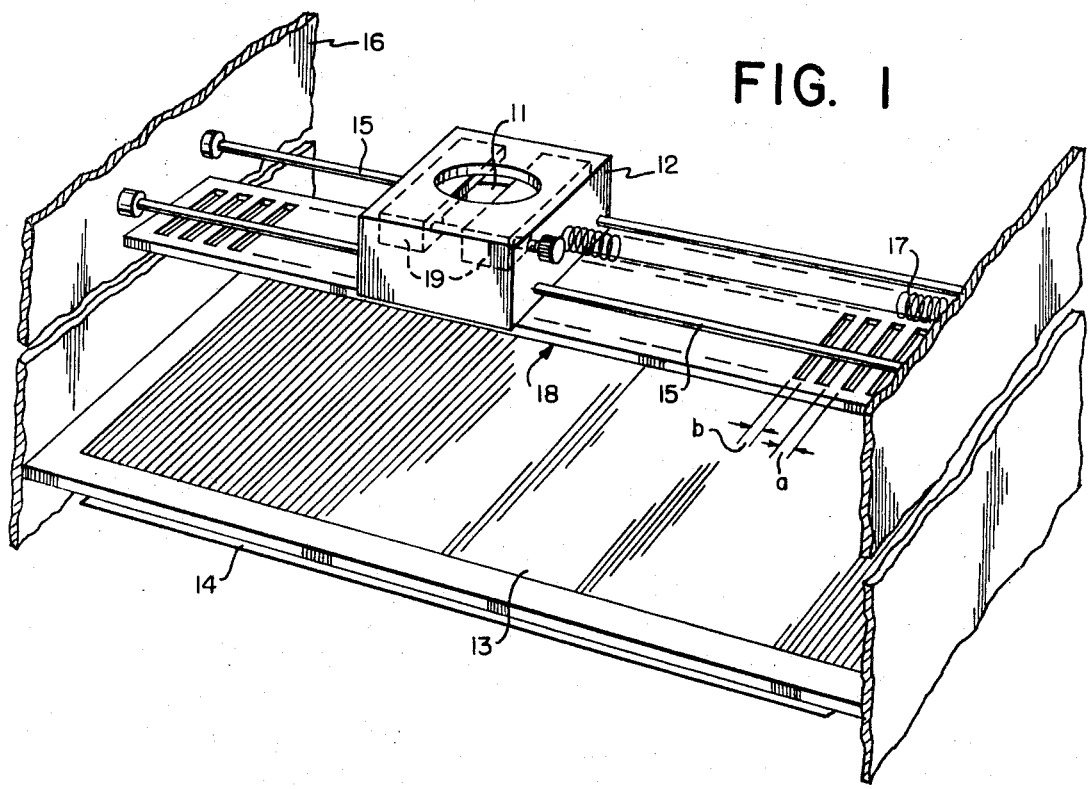
FIG. 1 is a perspective view schematically illustrating a discontinuous scan camera constructed in accordance with the invention.

FIG. 1 illustrates a discontinuous scan camera in accordance with the invention wherein a single lens 11 is slideably carried on a mount 12 constructed to scan across the lenticular or line screen 13 and film 14 (lying in the film plane) on rails 15 carried by the camera body 16. Mount 12 may be propelled across the film plane by a spring 17, chosen in accordance with well established mechanical principles to provide a uniform scan speed, or by any other expedient electrical or mechanical drive mechanism. In this embodiment of the invention the lens scan is carried out at substantially constant velocity and the discrete points of view from which the perspectives are formed are obtained by way of an aperture mask 18 disposed immediately beneath mount 12 and extending in the direction of the scan. Mask 18 may be defined as a series of opaque or blank portions of width $a$ and aperture portions of width $b$, the number of apertures being equal to the number of perspectives taken during the scan and the aperture width $b$ being taken as $w$ in determining the spacing of the perspective points of view. The scanning lens should be rectilinearly apertured, preferably at an aperture width approximately equal to the aperture width $b$ of the mask. For embodiments of the invention employing an aperture mask, the slit width $b$ of the mask is defined as the effective lens aperture width $w$. The introduction of such a mask into the optical path of what would otherwise be a continuous scan camera, forming perspectives at points of view separated by distances at least equal to $w$ and preferably greater than $w$ in accordance with the invention, results in images of significantly higher quality due to the reduction of the sources of error described above, such as perspective overlap and lens motion blur. If the lens width is made too much smaller than the mask aperture width $b$, especially for a large mask aperture width, the camera acts over each mask aperture like a continuous scan camera, resulting in image degradation. If on the other hand the mask aperture width is made much smaller than the lens aperture width, then lens motion-type blur results. A noticeable improvement in image quality over the ordinary continuous scan camera has been found to result from the introduction of a mask with effective aperture widths spaced by a length corresponding to at least twice the minimum resolution angle for the selector screen treated as a diffraction limited screen, which is used herein to approximate roughly the sum of the minimum resolution angles for the taking and viewing selector screen treated as diffraction limited.

A specific example contains the following parameters. A continuous scan camera has a 30mm diameter lens with a focal length of 273mm. The lens is rectilinearly apertured with a slit width $c = 1/16$ inch and a slit height — one inch. The scan path is five inches long and the lens-to-image plane distance is 14 inches. A lenticular screen with 44 lenticules per inch is used in the camera (purchaseable from Edmund Scientific, Co., Stock No. 80,130, catalogue 711). The scan time is 1/8 second for a correct exposure of the film.

The quality of images produced by this camera may be significantly improved by the introduction of a mask behind the scan path with 13 apertures of width $b = \frac{1}{8}$ inch and a height of one inch. The space between the apertures $a = \frac{1}{4}$ inch. The scan time required for properly exposing the film is approximately $[t_c(a+b)]/b$ where $t_c$ is the scan time of the continuous scan camera. For this case, the scan time should thus be about $3 \times \frac{1}{8}$ or approximately $\frac{3}{8}$ seconds.

There may be light stops provided at each end of the scan such that the camera remains light tight between exposures or scans. The lens may also be provided with a conventional shutter for this purpose which may be manually or automatically opened during each scan and remains shut between exposures as well as while the lens is being reset, in order to load spring 17 in preparation for the next scan. Note that the minimum spacing $d$ of points of view at which perspectives are taken (or in this case between the centers of aperture portions of the aperture mask 18) is, in accordance with the invention, at least equal to $w$. The width of the aperture on the scanning lens and its height may be independently adjusted by a mask 19, illustrated in FIG. 3. To control the light transmitted by the lens and perspective depth-of-field, without adjusting the height of the slit apertures in the multi-aperture mask, the height $h$ of the aperture in FIG. 3 may be regulated. Note that the entire aperture mask 18 lies within the acceptance angle of the selector screen (e.g. - for a lenticular screen, the angle of view of a single lenticule or in a slit selector screen, the angle of view of a single slit. The two are interchangeable for the purpose of this disclosure.) Different aperture masks with new parameters for aperture width, aperture height, and aperture spacing may be used for different image improvement needs or for different aperture mask-to-film distances.

The introduction of an aperture mask as described in the optical path of the specified camera where the continuous scanning lens is replaced by a stationary five inch long, one inch high, 273mm focal length large lens, would also result in better three-dimensional images than such a large lens camera would otherwise produce. The mask is, in accordance with the invention, a device useable to improve many forms of continuous perspective selector screen cameras (which the large lens camera is).

The time period for an entire scan of lens 11 should preferably be made fast enough so that there is no significant motion of the objects being photographed between the exposure of the first and last perspectives, consistent with the available light conditions. The time for each individual perspective exposure should preferably be made small enough both to effectively stop without blur the motion of objects in object space and to avoid blur from the relative motion between the lens and the selector screen.

In the specific scan embodiment described above, the exposure times are fast enough for convenient portraiture with a hand-held camera. With the specified five inch long aperture mask and a scan time of ⅜ seconds, the exposure time per perspective is approximately $(b + c)/r$ where the scan rate $r = 5$ inches/(⅜) = 13 ½ in/sec. Thus $(c + b)/r$ equals approximately 1/75 second.

Figure 2:
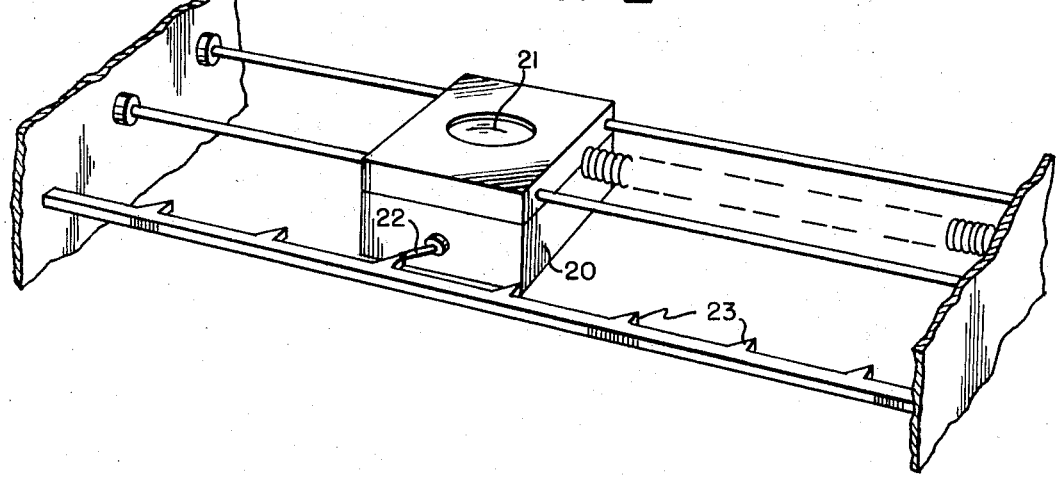
FIG. 2 is a perspective view of a specific scanning mechanism in accordance with the invention.

FIG. 2 illustrates an embodiment of the invention in which a discontinuous scan is obtained by repetitively opening a shutter at discrete points along the scan, the camera being otherwise as illustrated in FIG. 1. The shutter, shown generally in a housing 20 mounted beneath lens 21, may be a conventional shutter or an electro-optical shutter (e.g. a Kerr cell) such as is known in this art which is opaque to visible light except when an electrical field is applied across it, rapidly rendering it transparent to visible light. Any shutter may be employed which provides the requisite response time and which may be triggered by a realizable mechanical or electrical mechanism at discrete points along the scan. The shutter in FIG. 2 is triggered by a mechanical trigger 22 which is activated at selected points along the scan defined by mechanical cam members 23. The length of the mechanical activator or of trigger 22 and the shape of cams 23 may be chosen in accordance with the invention to control the length of time during which the shutter is open during the exposure for each perspective. A mask such as that shown in FIG. 3 may be employed to control both the vertical and horizontal dimensions of the aperture of lens 21.

A specific embodiment of the device shown in FIG. 2 may use a leaf shutter behind a 30mm diameter lens with a focal length of 273mm at a distance of 15 inches from a selector screen with 44 lenticules per inch (Edmund Scientific, Co., Catalogue 711, Stock No. 80,130) and an acceptance angle approximately equal to 2 arctan (0.2). Eleven exposures may be made at points of view separated by one-half inch. The lens should be rectilinearly apertured with a width of one-fourth inch and a height of one-half inch. With three 500 watt photofloods an average of approximately five feet from the subject, the approximate exposure time per perspective required for Kodak 5 inches × 7 inches Type B Ektachrome film is 1/10 second. The total scan time is made 10 seconds for a scan path of length six inches. While faster scan times are better able to prevent object motion between perspectives, slower scan times minimize lens motion blur; the scan time chosen is a compromise between the two suiting the particular application. With fast color films having ASA values of 500, the 10 second scan time could be easily reduced by a factor of 10 or more.

Instead of the mechanically operated shutter illustrated in FIG. 2, the individual exposure for each perspective may be controlled by a strobe light (not shown) which may either be timed internally and synchronized with the scan or may be triggered for each perspective exposure by the cam and trigger arrangement of FIG. 2. A specific embodiment could use a strobe with 40 flashes per second with a 1/10000 second duration and a lens scan of one-fourth second over a path 5 inches long to obtain perspectives every one-half inch along the path. The lens aperture width in this example is one-fourth inch and its height is one inch.

For most strobe lights, fairly fast film must be used for such an embodiment such as Polaroid 3000 ASA Type 47 film. Note that in each of the specific examples described above, the spacing between perspective exposures is greater than $w$.

Figure 3:
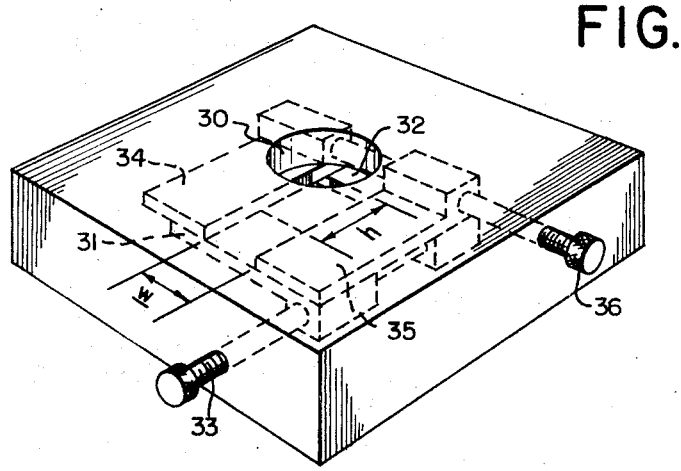
FIG. 3 is a perspective view of an aperture mask and lens in accordance with the invention.

FIG. 3 illustrates an adjustable aperture mask in accordance with the invention for independently controlling the light transmission of the lens 30 through control of its aperture height $h$, independently of the control over the sources of error enumerated above dependent on control of the aperture width $w$. Two pairs of mask elements are employed, one pair 31,32 being controllable by a screw member 33 in the vertical direction, and the pair 34,35 being controllable by a screw member 36, thus controlling the aperture width $w$ in the horizontal direction. Screws 33 and 36 are appropriately threaded so that the aperture elements controlled by each move toward each other upon rotation in one direction and away from each other upon rotation in the other direction of the screw remaining symmetrical about the center line of the lens. In this manner the width $w$ may be independently adjusted so that the lens is narrow enough to avoid large lens parallax effects, perspective overlap, pupillary error and lens motion blur but yet wide enough to avoid significant diffraction effects and also to obtain optimum light input under the desired conditions. Large lens parallax effects may be avoided by making the width $w$ small enough such that it subtends, at the given lens-to-image plane distance, less than the minimum resolution angle of the imaging elements of the selector screen. In practice, where the viewing distance is approximately equal to or less than the lens-to-image plane distance, an aperture width of similar size to the pupil of the eye will avoid large lens effects. This is approximately between 1½ millimeters and 6 millimeters. In the embodiments of the invention described herein for example, diffraction effects come into play for lens aperture widths smaller than about 1/64 inch.

Figure 4:
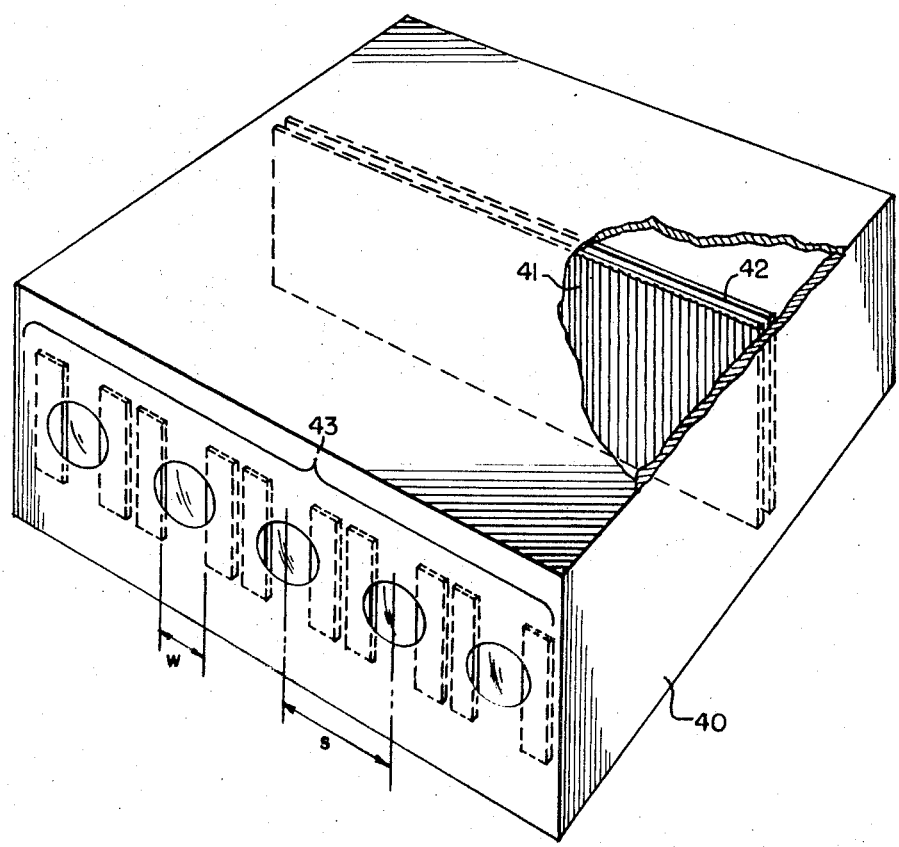
FIG. 4 is a front elevational view of a static camera constructed in accordance with the invention.

FIG. 4 is a front elevational view of a static camera of the invention in which five lenses are arrayed in a row upon lens mount 40 disposed to direct light through a selector screen 41 onto film plane 42. The lenses 43 may each be provided with an adjustable aperture mask as illustrated in FIG. 3 or they may be apertured by fixed aperture masks, such as by masking tape or by any convenient type of rectangular mask. The lens width may be determined by fixed masks and a single pair of masking elements, 31 and 32 in FIG. 3 may be provided extending the entire length of the lens group 43 to control light transmission in accordance with available lighting conditions and the nature of the particular subject matter being photographed. The width $w$ of each lens 43 is preferably narrow enough to minimize large lens parallax effects and large enough to minimize diffraction effects. The spacing $s$ between lens centers should be greater than $w$, as described above.

A specific embodiment of the invention in accordance with FIG. 4 contains eleven ⅜ inch wide rectilinearly cut lenses with focal lengths of 273mm, each restilinearly apertured to a width of one-fourth inch and a height of one-half inch. The lens centers are spaced one-half inch apart. The lens-to-image plane distance is 15 inches. With three 500 watt photofloods illuminating the scene from an average distance of approximately five feet, the exposure time with Kodak 5 inches × 7 inches type B Ektachrome film is approximately 1/10 second. The distance of the subject from the camera is approximately three feet. The lenticular screen used has 44 lenticules/inch (Edmund Scientific, Co., Catalogue 711, Stock No. 80,130) and an acceptance angle of approximately 2 (arctan 0.2).

In accordance with the invention, the spacing $d$ between lens centers is preferably equal to $w + p$ and should in any event, within the scope of the invention, be greater than $w$ for this multiple lens, static camera. In order to eliminate pupillary error, the lens-center spacing should be at least $w + p + p$, $p$ being approximately the width of the human pupil. It is not possible to specify the width of the human pupil, as pupil diameter varies from person to person, and additionally as a function of light level. Thus the term "approximately the width of the human pupil" means for purposes of this specification between about 1.5 and 6 millimeters, it being understood that the object is to eliminate error due to a pupil being able to see more than one perspective at a time. To minimize perspective overlap for a particular depth plane in object space 38 inches from the camera, in accordance with the invention, the individual perspectives should be best focused for this distance. The lens-to-image plane distance for this purpose should therefore, according to $1/D_i + 1/D_o = 1/f$, be set approximately equal to 15 inches as has been done.

In accordance with the invention, calling the lens-to-image plane distance of 15 inches "$D_o$", the distance $D_i$ behind the selector screen at which the film should be located to receive the sharpest image of the lens apertures as projected by a selector screen element, is approximately calculable from $1/D_i + 1/D_o = 1/f$ for selector screens where the selector screen elements are treatable as "thin" lenses. $f$ is the local length of a selector screen element. For selector screens with, for example, "thick" lenticules, $D_i$ may be found according to well known optical principles. The requisite thickness of a screen to have $D_i$ commensurate with its rear surface may be similarly found.

A specific example in accordance with the invention of a highly compact, discrete perspective camera with a viewing selector screen different from the camera selector screen is as follows. The camera contains a lenticular screen of index of refraction =2 with 60 lenticules/inch and a focal length of 7/150 inches, with lenticules of spherical cross-section (the latter is true for both taking and viewing screens). The focal plane falls exactly on the rear surface of the screen. The screen has an acceptance angle of 2 (arctan 2-1/2/7). The camera has four lenses of ¼ inch diameter with lens centers spaced apart ½ an interocular distance or 1¼ inches. The lens-to-image plane distance is seven inches.

"Perspective jumble" as used herein refers to an optical effect occurring uniquely with discrete perspective type cameras, as described herein; it does not occur with infinite perspective type cameras such as continuous scan or large lens types. If an image is viewed from a distance significantly greater than the lens-to-taking selector screen distance, each eye sees a jumble of perspectives taken from different points of view rather than each eye seeing perspectives taken from a single point of view, as is required for proper reconstruction of the image. Perspective jumble, arising from a viewing distance which is significantly different from the lens-to-image plane distance of the camera, can be avoided by making the taking and viewing selector screen correspondingly different. If the viewing screen were the same as the camera screen, the optimum viewing distance to avoid jumbling of perspectives would be seven inches, the same as the lens-to-taking selector screen distance. Most people's eyes will not focus over so small a distance. By using a viewing lenticular screen with 60 lenticules/inch, an index of refraction =2, and a focal length equal to the screen thickness = 7/75 inches, the optimum viewing distance becomes 14 inches, which is within the focusing range of most people's eyes. At a viewing distance of 14 inches with this viewing screen, the centers of the range over which each perspective is viewable are spaced by the same distance as the lens centers of the camera were separated. The parameters of the viewing screen were chosen such that this would occur at the preferred viewing distance.

Features of this invention are applicable to autostereoscopic parallax photography with parallax in two dimensions, such as in integral photography.

It will be understood by those skilled in the art that the invention is not limited to the specific features described with respect to the above embodiments, and that various changes and modifications may be made therein without departing from the scope of the invention, which is limited only in accordance with the following claims.

I claim:

1. A camera for producing autostereoscopic three-dimensional images, which camera may be hand-held and which need not be moved relative to the object being photographed, comprising a camera body, a selector screen disposed therein and a light sensitive material disposed in a film plane immediately behind the selector screen, and means including at least one lens for forming a plurality of perspectives from a plurality of corresponding points of view, said points of view being separated by a distance $d$ at least equal to $w$ plus a distance, at the lens, corresponding to twice the minimum resolution angle for the selector screen treated as diffraction limited, and no greater than $w$ plus a distance, at the lens, corresponding to four times the minimum resolution angle of the actual selector screen, where $w$ is the aperture width of said lens.

2. A camera for producing autostereoscopic three-dimensional images, which camera may be hand-held and which need not be moved relative to the object being photographed, comprising a camera body, a selector screen disposed therein and a light sensitive material disposed in a film plane immediately behind the selector screen, and means including at least one lens for forming a plurality of perspectives from a plurality of corresponding points of view, said points of view being separated by a distance $d$ at least equal to $w$ plus a distance, at the lens, corresponding to twice the minimum resolution angle for the selector screen treated as diffraction limited and no greater than $w$ plus a distance, at the lens, corresponding to four times the minimum resolution angle for the system of the actual selector screen and said light sensitive material, where $w$ is the lens aperture width.

3. A camera as defined in claim 2 wherein said means includes a plurality of lenses each disposed at a respective point of view for simultaneously exposing the film to form perspectives from all of said points of view.

4. A camera as defined in claim 3 wherein the lenses are spaced apart a distance $d$ plus an additional amount $p$ between lens centers where $p$ is the approximate width of the human pupil.

5. A camera for producing autostereoscopic three-dimensional images comprising a camera body, a lens, a selector screen disposed in said body and a light sensitive material disposed in a film plane immediately behind the selector screen, lens scanning means including a lens and a mechanism for scanning the lens across the selector screen along a path defining a plurality of points of view from which perspectives are to be taken, and perspective exposure means for exposing the film to form a perspective at each of such points of view, such points of view being separated by a distance $d$ relative to the selector screen greater than $w$ by a distance, at said lens scan path, corresponding to at least twice the minimum resolution angle for the selector screen treated as diffraction limited, where $w$ is the aperture width of said lens.

6. A camera as described in claim 5 wherein said scan mechanism includes means for stopping the lens at each point of view along said scan path for sufficient time to form a perspective there at.

7. A camera as defined in claim 5 wherein the scanning mechanism moves the lens in a continuous motion, said perspective exposure means exposing the film to form a perspective at each of such points of view for a time period sufficiently short in comparison with the scan speed to effectively stop relative motion between the lens and the camera during each exposure.

8. A camera as defined in claim 7 wherein said perspective exposure means includes an aperture mask disposed in the optical path of the lens for admitting light to the film only at selected points along the scan path corresponding to such points of view.

9. A camera as defined in claim 7 wherein said perspective exposure means includes a source of strong illumination, and means for triggering said source to illuminate the object being photographed at each point of view during the lens scan for a time period sufficiently short relative to the scan speed to effectively stop relative motion between the lens and the camera during each exposure.

10. In an autostereoscopic camera for producing three-dimensional images and including at least one lens mounted on a camera body containing a selector screen and a film plane directly behind the selector screen for carrying a light sensitive material, the improvement comprising a rectilinear aperture mask associated with each lens, and means for adjusting the height of the rectilinear aperture independently of its width for controlling the exposure and depth of field for each perspective taken by such lens independent of control of large lens pseudoscopic effects.

11. A method of producing autostereoscopic three-dimensional images with a camera, including a single lens capable of forming perspectives from multiple discrete points of view, a selector screen and a light sensitive material disposed in a film plane immediately behind the selector screen, comprising the steps of separating said points of view by a distance $d$ relative to the selector screen greater than $w$ by a distance, at the lens, corresponding to at least twice the minimum resolution angle for the selector screen treated as diffraction limited, where $w$ is the aperture width of said lens, scanning said lens sequentially through each of said plurality of discrete points of view and exposing the film through said lens at each of said points of view thereby recording each of said perspectives on said film.

12. A method as defined in claim 11 including the steps of scanning said lens continuously and exposing the light sensitive material for each perspective for a time period short enough relative to the scan speed to effectively stop the motion of the lens relative to the camera during such exposure.

13. A method as defined in claim 12, including repetitively illuminating the objects to be photographed for time periods which are sufficiently short compared to the scan speed, to effectively stop the motion of the lens relative to the camera during each exposure, said illuminations being carried out at selected points during said scan corresponding to such points of view.

14. A method of avoiding perspective jumble in autostereoscopic three dimensional photographs taken with a camera having at least one lens disposed to take a plurality of perspectives from different points of view, a selector screen and a film plane directly behind said selector screen both containing a light sensitive material, the distance between said selector screen and lens being less than the mimimum focusing distance of the human eye, comprising steps of spacing from the resulting image to be viewed by a distance at least equal to the minimum focusing distance of the eye a viewing selector screen having an acceptance angle smaller than the acceptance angle of the taking selector screen, and viewing the resulting image through said viewing selector screen.

* * * * *